United States Patent
Kim et al.

(10) Patent No.: US 11,967,735 B2
(45) Date of Patent: Apr. 23, 2024

(54) BATTERY MODULE

(71) Applicant: LG Chem, Ltd., Seoul (KR)

(72) Inventors: Hyejin Kim, Daejeon (KR); Doohan Yoon, Daejeon (KR); Jaehun Yang, Daejeon (KR); Junyeob Seong, Daejeon (KR); Jong Woon Choi, Daejeon (KR); Junkyu Park, Daejeon (KR); Youngho Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 791 days.

(21) Appl. No.: 17/053,238

(22) PCT Filed: Dec. 2, 2019

(86) PCT No.: PCT/KR2019/016860
§ 371 (c)(1),
(2) Date: Nov. 5, 2020

(87) PCT Pub. No.: WO2020/116880
PCT Pub. Date: Jun. 11, 2020

(65) Prior Publication Data
US 2021/0280949 A1  Sep. 9, 2021

(30) Foreign Application Priority Data
Dec. 6, 2018 (KR) .................. 10-2018-0156145

(51) Int. Cl.
*H01M 50/505* (2021.01)
*H01M 50/105* (2021.01)
(Continued)

(52) U.S. Cl.
CPC ....... *H01M 50/505* (2021.01); *H01M 50/105* (2021.01); *H01M 50/209* (2021.01);
(Continued)

(58) Field of Classification Search
CPC .. H01M 50/50; H01M 50/105; H01M 50/209; H01M 50/211; H01M 50/529;
(Continued)

(56) References Cited

U.S. PATENT DOCUMENTS

| 5,871,861 A | 2/1999 | Hirokou et al. |
| 2011/0171498 A1 | 7/2011 | Baek |

(Continued)

FOREIGN PATENT DOCUMENTS

| CN | 102738432 A | 10/2012 |
| CN | 103688391 A | 3/2014 |

(Continued)

OTHER PUBLICATIONS

Search Report dated Jun. 28, 2022 from the Office Action for Chinese Application No. 201980034700.3 dated Jul. 5, 2022, 3 pages.

(Continued)

*Primary Examiner* — James M Erwin
(74) *Attorney, Agent, or Firm* — Lerner David LLP

(57) ABSTRACT

A battery module includes: a battery cell stack in which a plurality of battery cells are stacked, each battery cell of the plurality of battery cells including a portion of a battery case body extended outward as a cell terrace, a busbar frame connected to the battery cell stack, electrode leads protruding from the cell terraces, respectively, of the plurality of battery cells, and a partition wall disposed between immediately adjacent electrode leads and formed on the busbar frame, the partition wall located between the cell terrace protruding from an outermost battery cell of the plurality of battery cells in the battery cell stack and the cell terrace protruding from the battery cell immediately adjacent to the outermost battery cell.

17 Claims, 5 Drawing Sheets

(51) Int. Cl.
  *H01M 50/209* (2021.01)
  *H01M 50/211* (2021.01)
  *H01M 50/289* (2021.01)
  *H01M 50/50* (2021.01)
  *H01M 50/529* (2021.01)
  *H01M 50/533* (2021.01)
  *H01M 50/593* (2021.01)

(52) U.S. Cl.
  CPC ....... *H01M 50/211* (2021.01); *H01M 50/289* (2021.01); *H01M 50/50* (2021.01); *H01M 50/529* (2021.01); *H01M 50/533* (2021.01); *H01M 50/593* (2021.01)

(58) Field of Classification Search
  CPC . H01M 50/289; H01M 50/533; H01M 50/593
  USPC ......................................................... 429/163
  See application file for complete search history.

(56) References Cited

U.S. PATENT DOCUMENTS

| | | |
|---|---|---|
| 2012/0231300 A1 | 9/2012 | Park et al. |
| 2012/0328908 A1 | 12/2012 | Han et al. |
| 2013/0216878 A1 | 8/2013 | Merriman et al. |
| 2014/0023909 A1 | 1/2014 | Suzuki |
| 2014/0127550 A1 | 5/2014 | Roh et al. |
| 2017/0331097 A1 | 11/2017 | Lee et al. |
| 2018/0194235 A1 | 7/2018 | Kim et al. |
| 2018/0269435 A1 | 9/2018 | Lee et al. |
| 2018/0287110 A1 | 10/2018 | Yanagihara et al. |
| 2018/0315977 A1 | 11/2018 | Park et al. |
| 2019/0189979 A1 | 6/2019 | Choi et al. |

FOREIGN PATENT DOCUMENTS

| | | | |
|---|---|---|---|
| CN | 104272494 A | 1/2015 | |
| CN | 107925028 A | 4/2018 | |
| CN | 108028415 A | 5/2018 | |
| CN | 108140778 A | 6/2018 | |
| EP | 2693516 A1 | 2/2014 | |
| EP | 3331059 A1 | 6/2018 | |
| EP | 3340338 A1 | 6/2018 | |
| JP | H07282841 A | 10/1995 | |
| JP | H10188942 A | 7/1998 | |
| JP | 2014212033 A | 11/2014 | |
| KR | 20110082747 A | 7/2011 | |
| KR | 101136800 B1 | 4/2012 | |
| KR | 20120055156 A | 5/2012 | |
| KR | 101305250 B1 | 9/2013 | |
| KR | 101363598 B1 | 2/2014 | |
| KR | 20160077765 A | 7/2016 | |
| KR | 20160081013 A | 7/2016 | |
| KR | 20160129820 A | 11/2016 | |
| KR | 20170103232 A | 9/2017 | |
| KR | 20180067672 A | 6/2018 | |
| KR | 101893960 B1 | 8/2018 | |
| KR | 20180119372 A | 11/2018 | |
| WO | WO-2017146384 A1 * | 8/2017 | .......... B60L 11/1877 |
| WO | WO-2017150807 A1 * | 9/2017 | .............. B60L 11/18 |

OTHER PUBLICATIONS

International Search Report for Application No. PCT/KR2019/016860 dated Mar. 18, 2020, 2 pages.

European Search Report for Application No. 19893593.4 dated Jul. 14, 2021. 2 pgs.

* cited by examiner

BATTERY MODULE

CROSS CITATION WITH RELATED APPLICATIONS

This application is a national phase entry under 35 U.S.C. § 371 of International Application No. PCT/KR2019/016860, filed Dec. 2, 2019, which claims the benefit of priority based on Korean Patent Application No. 10-2018-0156145 filed on Dec. 6, 2018, the disclosures of which are incorporated herein by reference in their entireties.

TECHNICAL FIELD

The present disclosure relates to a battery module, and more particularly to a battery module having a busbar frame shape for preventing contact.

BACKGROUND ART

Secondary batteries, which are easily applied to various product groups and has electrical characteristics such as high energy density, are universally applied not only for a portable device but also for an electric vehicle (EV) or a hybrid electric vehicle (HEV), an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module includes a plurality of stacked battery cells and a busbar assembly for electrically connecting electrode leads of the plurality of battery cells. Here, the busbar assembly includes a busbar frame having lead slots through which the electrode leads of the battery cells pass individually, and a busbar mounted to the busbar frame and having busbar slots corresponding to the number of lead slots, so that the busbar is connected to the electrode leads passing through the busbar slots by welding or the like.

However, in the conventional battery module, when the number of cell terraces and battery cells increases, the number of electrode leads also increases, and the electrode lead and cell terrace shapes may become compact, and thus, adjacent electrode leads can be in contact with the edge of the cell terrace.

FIG. 1 is a diagram showing a busbar frame in a conventional battery module. FIGS. 2a and 2b are enlarged views of a region "A" in FIG. 1. Specifically, FIG. 2a is a cross-sectional view showing the possibility that an electrode lead 40 and the edge of a cell terrace 30, which is a portion where the battery case body is extended, come into contact with each other, and FIG. 2b is a cross-sectional view showing that an insulating tape 60 is attached to prevent the electrode lead 40 from coming into contact with the edge of the cell terrace 30.

Referring to FIG. 1, a plurality of battery cells 10 are stacked, and at least one or more electrode leads 40 protruding from the cell terrace 30 extended from a pouch covering the battery cell 10 meets and passes through one lead slot.

Referring to FIG. 2a, when having a structure that becomes gradually narrower as the interval between adjacent cell terraces 30 moves away from the battery cell 10, the electrode lead 40 and the edge of the cell terrace 30 become close to each other, and they can come into contact with each other. When the electrode lead 40 comes into contact with the edge of the cell terrace 30, the cell terrace 30 has a potential, and the life of the battery cell 10 may be shortened or the pouch may be corroded.

Referring to FIG. 2b, a separate insulating tape 60 can be attached in order to prevent contact between the above-mentioned electrode lead 40 and the edge of the cell terrace 30. However, the method of attaching the insulating tape 60 requires additional fees and processes, and if the attachment position is not appropriate, there is still a possibility that contact will occur. In addition, since the adhesive force of the insulating tape 60 is not permanently maintained, the insulating tape 60 is likely to be detached.

DETAILED DESCRIPTION OF THE INVENTION

Technical Problem

The present disclosure has been made to solve the above problems, and it is therefore an object to provide a battery module that does not allow the electrode leads to make contact with the edge of the cell terrace adjacent thereto in the outside of the busbar frame.

However, the problem to be solved by the embodiments of the present disclosure is not limited to the above-described problems, and can be variously expanded within the scope of the technical idea included in the present disclosure.

Technical Solution

A battery module according to an exemplary embodiment of the present disclosure includes: a battery cell stack in which a plurality of battery cells are stacked, each battery cell of the plurality of battery cells including a portion of a battery case body extended outward as a cell terrace, a busbar frame connected to the battery cell stack, electrode leads protruding from the cell terraces, respectively, of the plurality of battery cells, and a partition wall disposed between immediately adjacent electrode leads and formed on the busbar frame, the partition wall located between the cell terrace protruding from an outermost battery cell of the plurality of battery cells in the battery cell stack and the cell terrace protruding from the battery cell immediately adjacent to the outermost battery cell.

The partition wall may have a bent structure.

A plurality of path guiders is formed on the busbar frame, and the partition wall may be disposed between two path guiders of the plurality of path guiders located at an outermost part of the busbar frame.

Each electrode lead is inserted into a lead slot formed on the busbar frame, and the electrode lead protruding from the cell terrace of the outermost battery cell and an end of the cell terrace protruding from the battery cell immediately adjacent to the outermost battery cell can be separated by the partition wall.

A plurality of additional partition walls may be disposed one by one between path guiders immediately adjacent to each other among a plurality of path guiders formed on the busbar frame.

Among the battery cells included in the battery cell stack, a bent angle of each partition wall of the plurality of partition walls may gradually decrease from the outermost battery cell to a central battery cell of the plurality of battery cells.

Both a polarity of the electrode lead protruding from the cell terrace protruding from the outermost battery cell and a polarity of the electrode lead protruding from the cell terrace protruding from the battery cell immediately adjacent to the outermost battery cell may be negative.

The interval between the cell terrace protruding from the outermost battery cell and the cell terrace protruding from the battery cell immediately adjacent to the outermost battery cell may become gradually narrower along a direction in which the electrode leads protrude.

A bent structure of the outermost partition wall may be folded in a direction in which the interval between the cell terrace protruding from the outermost battery cell and the cell terrace protruding from the battery cell immediately adjacent to the outermost battery cell becomes narrower.

The electrode leads immediately adjacent to each other with the partition wall being interposed therebetween pass through a lead slot formed on the busbar frame and can meet and connect at a rear surface of the busbar frame.

The cell terrace protruding from the outermost battery cell may be bent more than the cell terrace protruding from the battery cell immediately adjacent to the outermost battery cell.

Each electrode lead is inserted into a lead slot formed on the busbar frame, and an end of any one of the cell terraces, and the electrode lead connected to an end of the immediately adjacent cell terrace may be separated by the partition wall.

An interval between the cell terraces in which the electrode leads having the same polarity as each other protrude among the cell terraces may become narrower along a direction in which the electrode leads protrude.

The battery pack according to another embodiment of the present disclosure includes the above-mentioned battery module.

Advantageous Effects

According to the embodiments, it is possible to implement a battery module that forms a partition wall at the outermost part of the busbar frame and does not allow the electrode lead to make contact with the edge of the cell terrace adjacent thereto, thereby preventing a porch corrosion and a decrease in the cell life.

DETAILED DESCRIPTION OF THE EMBODIMENTS

Figure 1:
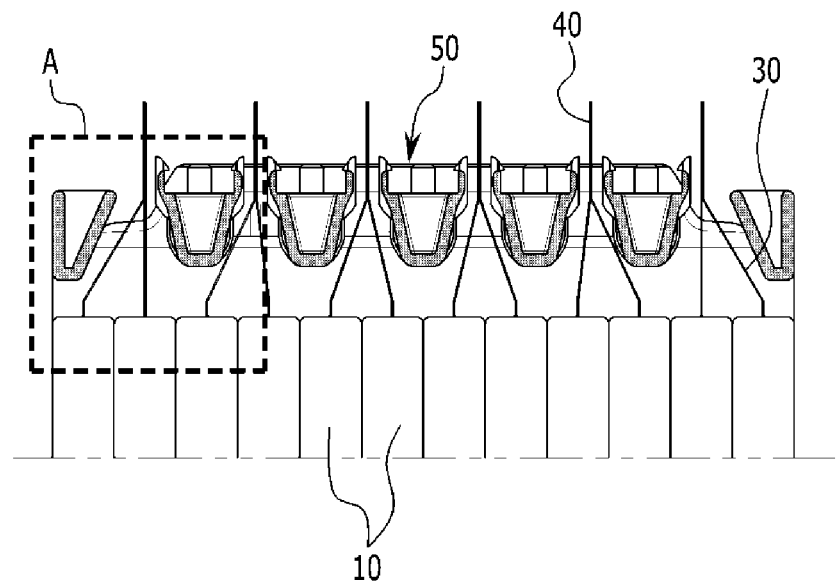
FIG. 1 is a diagram showing a busbar frame in a conventional battery module.
Figure 2A:
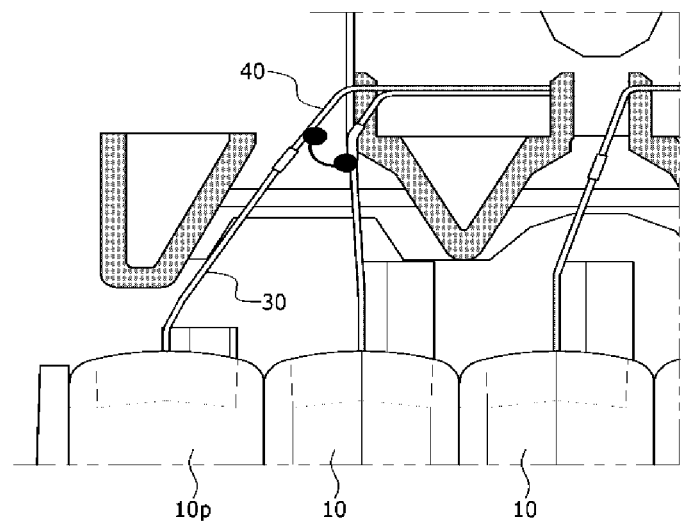
FIGS. 2a and 2b are enlarged views of a region "A" in FIG. 1.
Figure 2B:
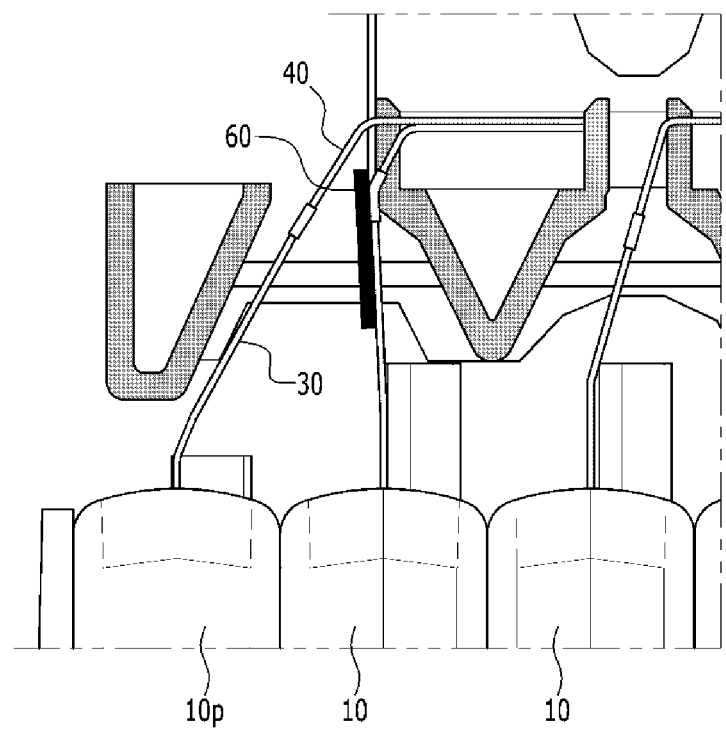

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 3:
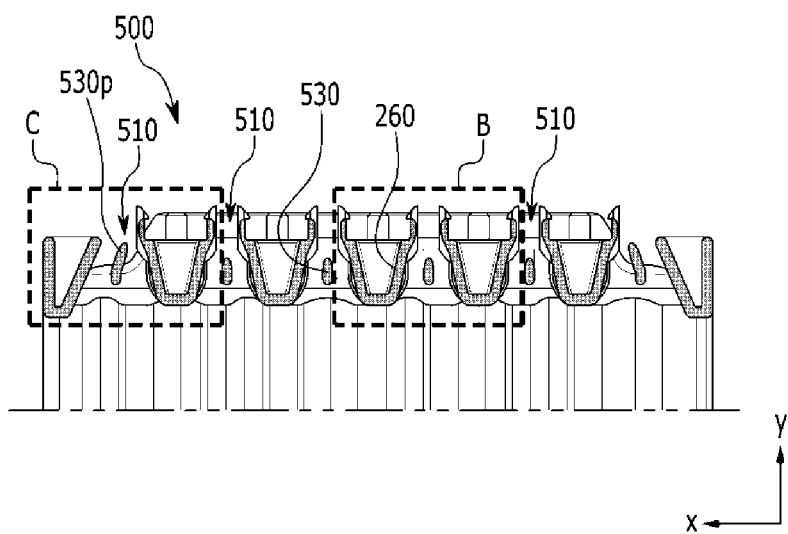
FIG. 3 is a plan view showing a busbar frame included in a battery module according to one embodiment of the present disclosure.
Figure 4:
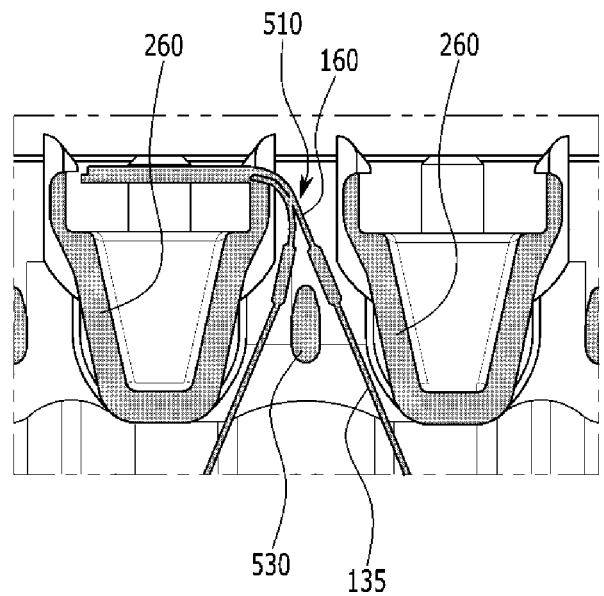
FIG. 4 is an enlarged view showing a connection part between the battery cell stack and the busbar frame in the region "B" in FIG. 3.

FIG. 3 is a plan view showing a busbar frame included in a battery module according to one embodiment of the present disclosure. FIG. 4 is an enlarged view showing a connection part between the battery cell stack and the busbar frame in a region "B" of FIG. 3.

Referring to FIGS. 3 and 4, the busbar frame 500 included in the battery module according to one embodiment of the present disclosure includes a path guider 260, and a plurality of lead slots 510 are formed in the busbar frame 500. The lead slot 510 may be an opening into which an electrode lead described later is inserted.

A plurality of the path guiders 260 may be provided. Here, the plurality of path guiders 260 may be provided to correspond to the number of the plurality of lead slots 510. The path guider 260 located at the outermost part of both sides of the busbar frame 500 includes a first branch part 260a and a second branch part 260b which are connected to each other (see FIG. 6). In the busbar frame 500, the first branch part 260a is parallel to the y-direction which is the direction in which the battery cell stack described later and the busbar frame 500 are connected. On the other hand, the second branch part 260b has a diagonal shape inclined in the x direction from the y direction.

A partition wall 530 is formed between the path guiders 260 adjacent to each other. At least one partition wall 530 may be formed between adjacent path guiders 260. If a large number of partition walls 530 are formed in a narrow space, the process may be complicated. Therefore, a structure in which one partition wall 530 is formed between adjacent path guiders 260 and two lead electrodes pass through one lead slot 510 with the partition wall 530 being interposed therebetween is preferable. In the present embodiment, the partition wall 530 may be disposed one by one between path guiders 260 adjacent to each other among the plurality of path guiders 260 formed on the busbar frame 500.

A negative electrode lead 160 may be inserted into a lead slot 510. The negative electrode lead 160 may be formed of copper, and thus is highly likely to cause corrosion if it comes into contact with the cell terrace 135 of an adjacent battery cell. The cell terrace 135 may be a portion where the battery case body is extended. A plurality of electrode leads 160 may be inserted into one lead slot 510. A plurality of electrode leads 160 may be separated and inserted by the partition wall 530 formed in the lead slot 510. After the lead electrode 160 passes through the lead slot 510, it may be electrically connected to a busbar via laser welding. The insertion structure of the electrode lead 160 may be variously modified according to the design change of the series and parallel connection structures of the battery cells.

Figure 5:
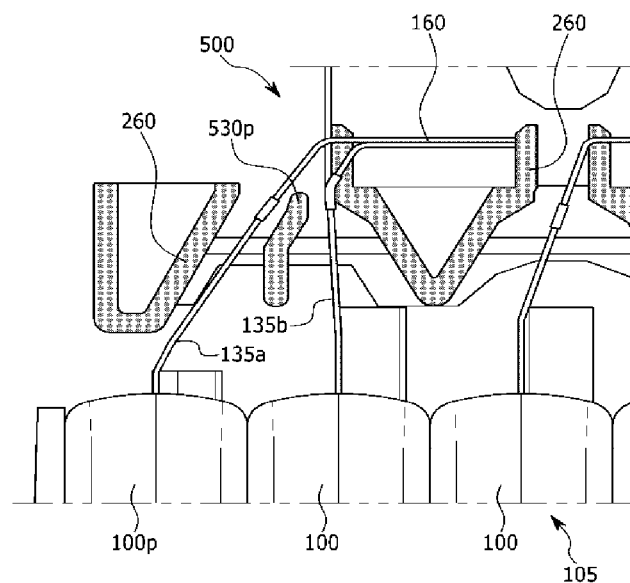
FIG. 5 is an enlarged view showing a connection part between the battery cell stack and the busbar frame in a region "C" of FIG. 3.

FIG. 5 is an enlarged view showing a connection part between the battery cell stack and the busbar frame in a region "C" of FIG. 3.

Referring to FIG. 3 and FIG. 5, the battery module according to the present embodiment includes a busbar frame 500 connected to the battery cell stack 105, and includes a cell terrace 135 protruding from the battery cell 100 and an electrode lead 160 protruding from the cell terrace 135.

A plurality of path guiders 260 for separating the electrode leads 160 are formed on the busbar frame 500, and the outermost partition wall 530p is formed between the two path guiders 260 located on the outermost part of the busbar frame 500. The outermost partition wall 530p is located between a first cell terrace 135a protruding from the outermost battery cell 100p and a second cell terrace 135b protruding from the battery cell 100 immediately adjacent to the outermost battery cell 100p, among the battery cells 100 included in the battery cell stack 105. The outermost partition wall 530p may have a bent structure. The first cell terrace 135a may have a more bent structure than the second cell terrace 135b.

In the present embodiment, both the polarity of the electrode lead 160 protruding from the first cell terrace 135a and that of the electrode lead 160 protruding from the second cell terrace 135b may be negative. The interval between the first cell terrace 135a and the second cell terrace 135b from which the electrode leads 160 having the same polarity as each other protrude becomes gradually narrower along the direction in which the electrode leads 160 protrude. The bent structure of the outermost partition wall 530p may be folded in a direction in which an interval between the first cell terrace 135a and the second cell terrace 135 becomes narrower.

Figure 6:
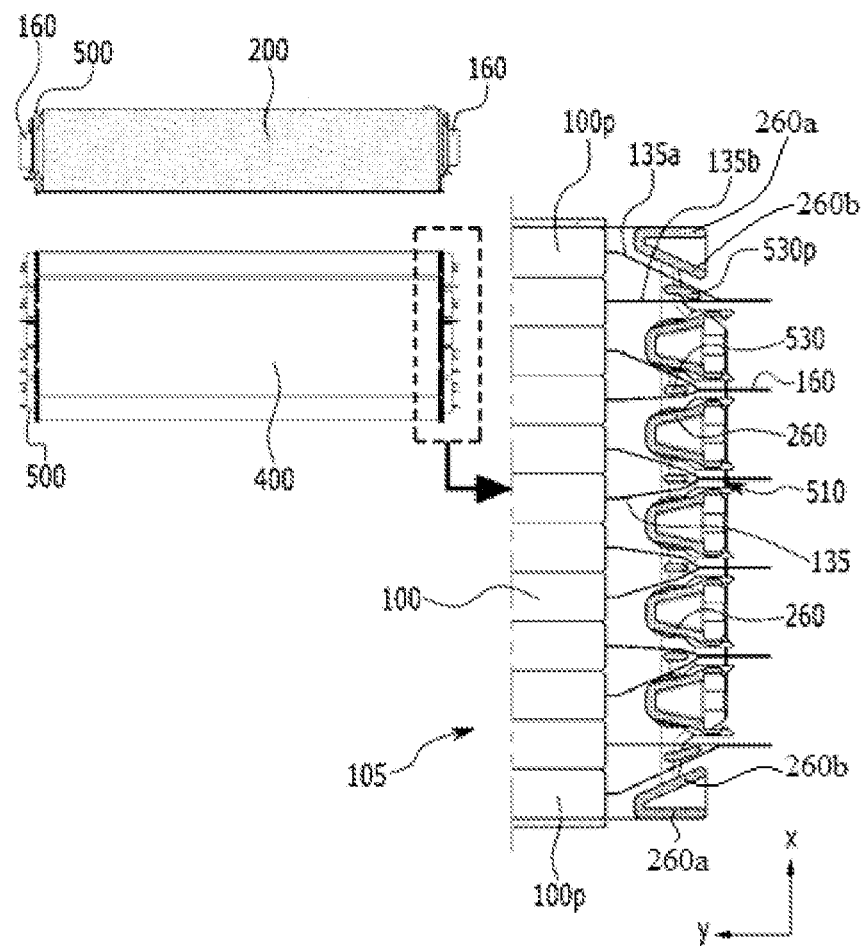
FIG. 6 is a plan view showing a battery module including the busbar frame of FIG. 3.

FIG. 6 is a plan view showing a battery module including the busbar frame of FIG. 3. The upper left view of FIG. 6 is a plan view of the structure in which the busbar frame 500 is mounted on the battery cell stack 105, as viewed from above, and the lower left view is a front view of the structure as viewed from the front, and the lower right view is an enlarged view of a part of the front view.

Thereby, after the adjacent electrode leads 160 in the plurality of battery cells 100 are paired in two, the electrode leads 160 may pass through the lead slot 510 via each path guider 260 to form a group of electrode leads 160. At this time, one electrode lead 160 may be disposed between the path guider 260 and the partition wall 530. The partition wall 530 has a shape elongated in a direction parallel to the y direction. However, the outermost partition wall 530p may have a bent structure that is folded in a direction in which an interval between the first cell terrace 135a and the second cell terrace 135b becomes narrower.

Structurally at the outermost part of the busbar frame 500, the first cell terrace 135a protruding from the outermost battery cell 100p has a structure that is more folded when extending from the outermost battery cell 100p compared to the cell terrace 135 protruding from the battery cell 100 located at the center of the busbar frame 500. Therefore, the possibility that the electrode lead 160 protruding from the first cell terrace 135a comes into contact with the second cell terrace 135b is increased. When the electrode lead 160 comes into contact with the second cell terrace 135b, the pouch case including the cell terrace 135 is corroded, and the cell terrace 135 has a potential, so that the life of the battery cell 10 may be shortened.

In this regard, according to the present embodiment, the interval between the electrode lead 160 protruding from the first cell terrace 135a and the end of the second cell terrace 135b may be maintained by the outermost partition wall 530p. Besides, the interval between any one of the ends of the adjacent cell terraces 135 and the electrode lead 160 connected to another end may be maintained by the partition wall 530. A cell terrace 135 is formed in which an interval becomes narrower along a direction in which the electrode leads 160 of each of the plurality of battery cells 100 protrude.

The path guider 260 is to guide so that the electrode lead 160 passes through the lead slot 510, before forming the cell terrace 135 that allows the electrode lead 160 of each of two adjacent battery cells 100 to be extended, and it may be formed on one side of the busbar frame 500. Specifically, the busbar frame 500 may have a path guider 260 in the inside of the back surface of the busbar frame 500 located apart from the battery cells 100.

The path guider 260 may form a predetermined guide space from the rear surface of the busbar frame 500 such that the two electrode leads 160 and the cell terraces 135 including the same become close to each other, before passing through the lead slot 510. To this end, the width of the guide space may be narrower toward the front direction (y-axis direction) of the busbar frame 500 having the lead slot 510 from the rear direction (y-axis direction) of the busbar frame 500.

Figure 7:
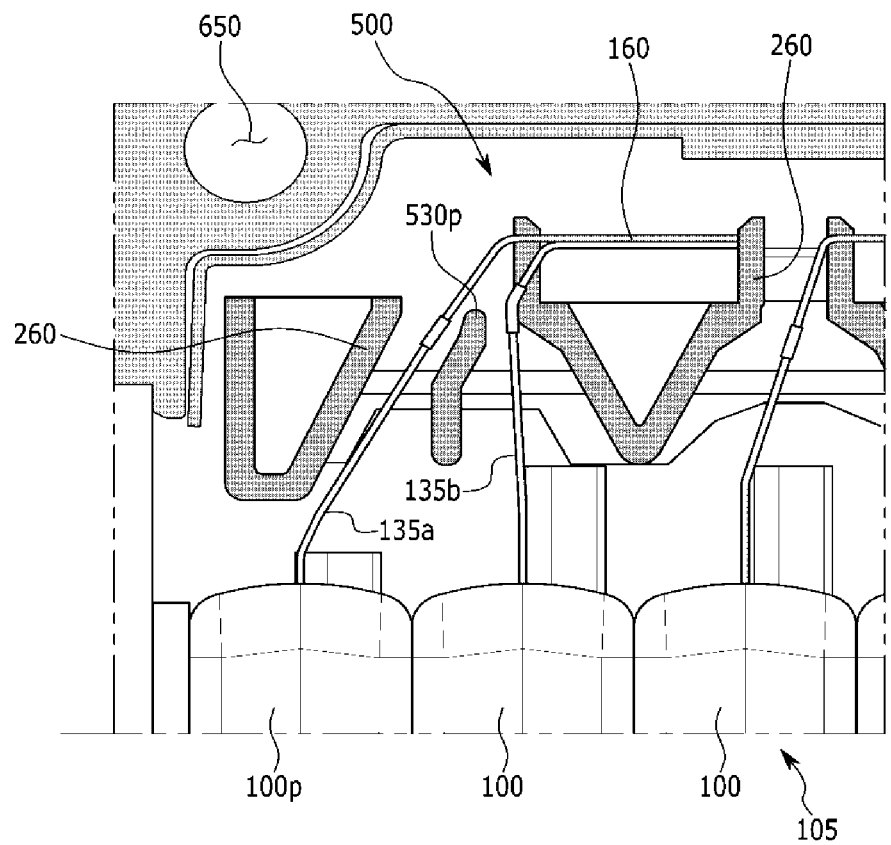
FIG. 7 is a diagram showing a busbar frame included in a battery module according to another embodiment of the present disclosure.

FIG. 7 is a view showing a busbar frame included in a battery module according to another embodiment of the present disclosure.

Referring to FIG. 7, the busbar frame included in the battery module according to the present embodiment is the same as the embodiment of FIG. 5 described above, but a hole 650 for mounting the battery module to the device is formed on the busbar frame 500.

As described above, when a hole 650 for mounting the battery module according to the present embodiment to a device such as a vehicle is formed on the outermost side of the busbar frame 500, a space for forming such a hole 650 should be provided. Thereby, since the outermost battery cell 100p is structurally folded compared to other battery cells 100, the possibility that the electrode lead 160 protruding from the first cell terrace 135a comes into contact with the second cell terrace 135b is increased. In this structure, the role of the partition wall 530p according to the present embodiment may be more important.

Figure 8:
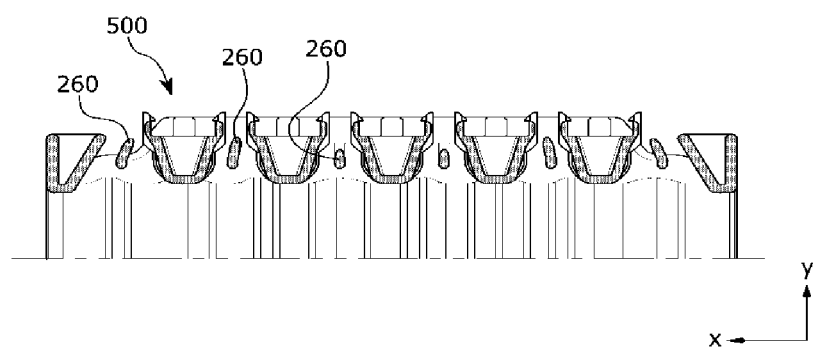
FIG. 8 is a plan view showing a connection part between a battery cell stack and a busbar frame in a battery module according to another embodiment of the present disclosure.

FIG. 8 is a plan view showing a connection part between a battery cell stack and a busbar frame in a battery module according to another embodiment of the present disclosure.

The embodiment described in FIG. 8 is substantially the same as the embodiment described in FIGS. 3 to 6, but there is some difference in the shape of the partition wall 530. Hereinafter, the differences will be mainly described. Except for the part where there are differences, the contents described with reference to FIGS. 3 to 6 may be applied to the present embodiment.

Referring to FIG. 8, the bent angle of the partition wall 530 may gradually decrease as the battery cells 100 included in the battery cell stack are moved from the outermost battery cell 100p to the central battery cell 100.

The battery module described above may be included in the battery pack. The battery pack may have a structure in which one or more battery modules according to the present embodiment are collected, and then packed by adding a battery management system (BMS) and a cooling device to manage the temperature or voltage of the battery.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

135: cell terrace 160: electrode lead
260: path guider 500: busbar frame
510: lead slot

The invention claimed is:

1. A battery module comprising:
    a battery cell stack in which a plurality of battery cells are stacked, each battery cell of the plurality of battery cells including a portion of a battery case body extended outward as a cell terrace,
    a busbar frame connected to the battery cell stack,
    electrode leads protruding from the cell terraces, respectively, of the plurality of battery cells, each electrode lead having a respective distal region extending away from the battery cell stack, and
    a partition wall formed on the busbar frame, the partition wall being located between the cell terrace protruding from an outermost battery cell of the plurality of battery cells in the battery cell stack and the cell terrace protruding from an inner battery cell immediately adjacent to the outermost battery cell, the partition wall being disposed between immediately adjacent ones of the electrode leads coupled to the respective outermost and inner battery cells, the distal regions of the immediately adjacent ones of the electrode leads being physically coupled with one another.

2. The battery module of claim 1,
wherein the partition wall has a bent structure.

3. The battery module of claim 1,
wherein a plurality of path guiders is formed on the busbar frame, and the partition wall is disposed between two path guiders of the plurality of path guiders located at an outermost part of the busbar frame.

4. The battery module of claim 1,
wherein each electrode lead is inserted into a lead slot formed on the busbar frame, and the electrode lead protruding from the cell terrace of the outermost battery cell and an end of the cell terrace protruding from the battery cell immediately adjacent to the outermost battery cell are separated by the partition wall.

5. The battery module of claim 1,
further comprising a plurality of additional partition walls disposed one by one between path guiders immediately adjacent to each other among a plurality of path guiders formed on the busbar frame.

6. The battery module of claim 5,
wherein among the battery cells included in the battery cell stack, a bent angle of each partition wall of the plurality of partition walls gradually decreases from the outermost battery cell to a central battery cell of the plurality of battery cells.

7. The battery module of claim 1,
wherein both a polarity of the electrode lead protruding from the cell terrace protruding from the outermost battery cell and a polarity of the electrode lead protruding from the cell terrace protruding from the battery cell immediately adjacent to the outermost battery cell are negative.

8. The battery module of claim 7,
wherein an interval between the cell terrace protruding from the outermost battery cell and the cell terrace protruding from the battery cell immediately adjacent to the outermost battery cell becomes gradually narrower along a direction in which the electrode leads protrude.

9. The battery module of claim 8,
wherein a bent structure of the outermost partition wall is folded toward the electrode lead coupled to the inner battery cell.

10. The battery module of claim 1,
wherein the electrode leads immediately adjacent to each other with the partition wall being interposed therebetween pass through a lead slot formed on the busbar frame and meet and connect at a rear surface of the busbar frame.

11. The battery module of claim 1,
wherein the cell terrace protruding from the outermost battery cell is bent more than the cell terrace protruding from the battery cell immediately adjacent to the outermost battery cell.

12. The battery module of claim 1,
wherein each electrode lead is inserted into a lead slot formed on the busbar frame, and an end of any one of the cell terraces and the electrode lead connected to an end of the immediately adjacent cell terrace are separated by the partition wall.

13. The battery module of claim 1,
wherein an interval between the cell terraces in which the electrode leads having the same polarity as each other protrude among the cell terraces becomes narrower along a direction in which the electrode leads protrude.

14. A battery pack comprising the battery module according to claim 1.

15. A device comprising the battery pack according to claim 14.

16. The battery module of claim 1,
wherein the partition wall is disposed so as to prevent each of the immediately adjacent ones of the electrode leads from contacting the cell terrace from which the other of the immediately adjacent ones of the electrode leads protrudes.

17. A battery module comprising:
a battery cell stack in which a plurality of battery cells are stacked, each battery cell of the plurality of battery cells including a portion of a battery case body extended outward as a cell terrace;
a busbar frame connected to the battery cell stack;
electrode leads protruding from the cell terraces, respectively, of the plurality of battery cells;
a partition wall disposed between immediately adjacent electrode leads and formed on the busbar frame, the partition wall located between the cell terrace protruding from an outermost battery cell of the plurality of battery cells in the battery cell stack and the cell terrace protruding from the battery cell immediately adjacent to the outermost battery cell; and
a plurality of additional partition walls being disposed one by one between path guiders immediately adjacent to each other among a plurality of path guiders formed on the busbar frame,
wherein among the battery cells included in the battery cell stack, a bent angle of each partition wall of the plurality of partition walls gradually decreases from the outermost battery cell to a central battery cell of the plurality of battery cells.

* * * * *